United States Patent Office.

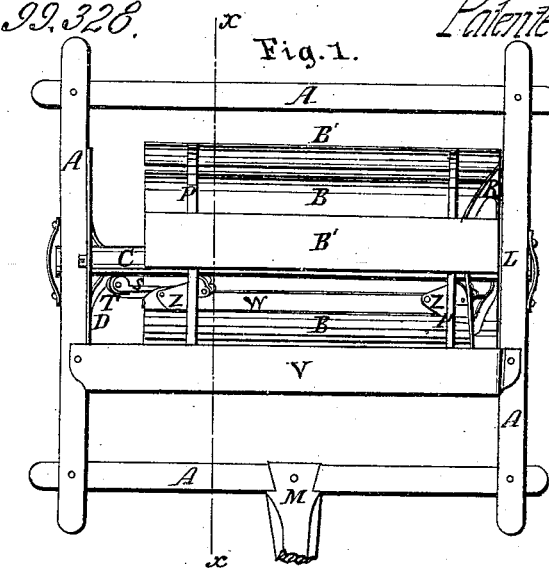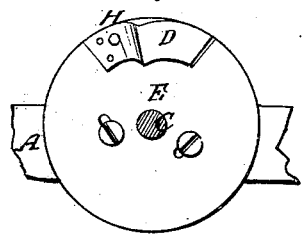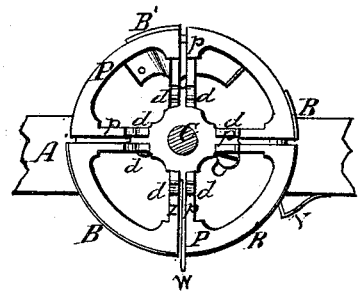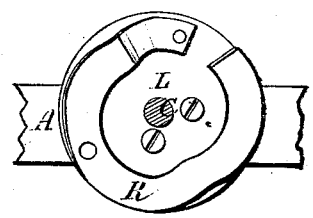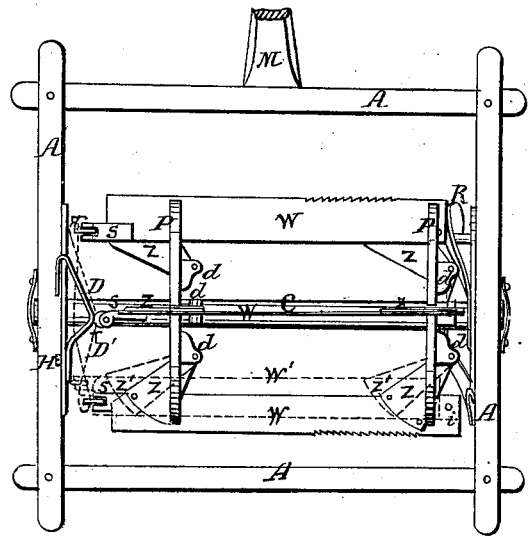

JOEL LEE, OF GALESBURG, ILLINOIS.

Letters Patent No. 99,328, dated February 1, 1870.

---

IMPROVEMENT IN STALK-CUTTERS.

---

The Schedule referred to in these Letters Patent and making part of the same.

---

I, JOEL LEE, of Galesburg, in the county of Knox, and State of Illinois, have invented certain Improvements in Stalk-Cutters, of which the following is a specification.

Nature and Objects of the Invention.

The nature of my invention relates to an improvement in stalk-cutters; and

The invention consists, first, in suspending the cutters or knives by oscillating arms inside of the roller or cylinder, in such manner that said cutter shall have a longitudinal movement at the same time that they are struck downward laterally, thus insuring greater certainty in cutting the stalks.

It also consists in an arrangement of disks or plates at each end of the roller, carrying-cams or eccentrics, for the purpose of giving the cutters the required alternate rectilinear movement.

It further consists in a scraper, combined with the roller, for the purpose of cleaning the dirt, &c., from said roller, and in a simple arrangement for preventing the cutters from operating while the machine is being moved from place to place.

It also consists in the peculiar construction and combination of wheels with slotted arms, with the cutters and vibrating arms.

Description of the Accompanying Drawings.

Figure 1 is a top plan or view of my invention.

Figure 2, bottom plan or view of the same, with the roller-plates and scraper removed, to show the working of the cutters.

Figure 3 is a sectional view on the line $x\ x$.

Figure 4 is an elevation of the disk E and cam D, fig. 1.

Figure 5 is an elevation of disk L and cam R, fig. 1.

A is the frame of the machine; a plain rectangle, and to which is attached the draught-pole M.

C is a shaft, carried in suitable bearings, in the sides of the frame A.

P P are wheels, made fast to and carried on the shaft B. The arms $p$ of the wheels P are slotted, as shown at fig. 3.

$d\ d$ are lugs or ears on the arms $p\ p$, and the oscillating arms Z are pivoted in these lugs $d\ d$, so that they may vibrate in the slots, in the arms of the wheels P.

W is the cutter, and is pivoted to the lower end of the arms Z.

S is a projection from the end of the cutter W, and carries a small wheel, T, with its periphery extending beyond the end of the projection S.

B B are plates, forming the roller or cylinder, and may be made to extend from the slot in one arm of the wheel P to the slot in the next, as at B B, fig. 3, or they may be narrow strips, and placed at one side of the slots, as at B' B', fig. 3, their main purpose being to hold the stalks while being cut, and the narrow ones being better adapted to rough ground, while the broader ones are better adapted to smooth ground, and in very rough land they may be left off entirely.

D is an eccentric, against which the small wheel T strikes in rotating the roller B, and drives the cutter W to the right, when it is immediately below the shaft C, and R is an eccentric or cam at the other end of the roller, against which the end of the cutter impinges, and is carried back to the left, and to the position shown by the dotted lines W' and Z'

The cutter W may have a smooth edge, as shown at the left-hand end, fig. 2, or it may have a sickle-edge, as shown at the right-hand end, same figure, and it will be plainly seen that the cutter W, in passing from the position shown by the dotted lines W', to the position shown by the full lines W, will not only have a vertical movement, but also a longitudinal movement, thus insuring more certainty in cutting wet and tough stalks. The peculiar movement of the cutters is also shown by the dotted line D'.

By removing the bolt H, the cam D may be taken off, and then, by carrying the cutter W to the position shown by the dotted lines W', and inserting a pin in the hole $i$, the roller may be revolved without operating the cutter, and the machine moved from field to field, or otherwise.

V is a scraper, for the purpose of keeping the roller free from dirt.

Friction-rollers may be used, if desired, at the sides of the cutter-blades.

Claims.

I claim, as my invention—

1. Suspending the cutters W, by oscillating arms Z, inside of the roller, substantially as described, and for the purpose set forth.

2. The combination and arrangement of the cams D and R with the cutters W, having either a smooth or a sickle-edge, substantially as described, and for the purpose set forth.

3. The combination and arrangement of the wheels P, having slotted arms $p$, with the arms Z and cutter W, substantially as described, and for the purpose set forth.

4. The arrangement of the pin $i$, and removable cam D, for throwing the cutter out of gear, substantially as described, and for the purpose set forth.

5. The scraper V, combined and operating with the roller B, cutter W, and arms Z, substantially as described, and for the purpose set forth.

Signed at Galesburg, Illinois, this 29th day of September, 1869.

JOEL LEE.

Witnesses:
P. R. RICHARDS,
J. B. HARSH.